(12) United States Patent
Han et al.

(10) Patent No.: US 7,218,590 B2
(45) Date of Patent: May 15, 2007

(54) METHOD AND APPARATUS OF DETECTING AN OPTIMAL WRITING POWER FOR AN AGED WRITABLE DISK

(75) Inventors: Yong Hee Han, Junrabook-do (KR); Sung Woo Park, Daegu-si (KR)

(73) Assignee: LG Electronics Inc., Seoul (KR)

( * ) Notice: Subject to any disclaimer, the term of this patent is extended or adjusted under 35 U.S.C. 154(b) by 576 days.

(21) Appl. No.: 10/255,952

(22) Filed: Sep. 27, 2002

(65) Prior Publication Data
US 2003/0090978 A1 May 15, 2003

(30) Foreign Application Priority Data
Sep. 28, 2001 (KR) .............................. 2001-60823

(51) Int. Cl.
*G11B 7/00* (2006.01)
(52) U.S. Cl. ................................. 369/53.22; 369/53.26
(58) Field of Classification Search ...................... None
See application file for complete search history.

(56) References Cited

U.S. PATENT DOCUMENTS 5,483,512 A * 1/1996 Yanagawa ................ 369/53.19

| 6,272,100 B1 * | 8/2001 | Toda et al. ................. 369/116 |
| 2002/0003760 A1 * | 1/2002 | Honda ..................... 369/47.52 |
| 2002/0067670 A1 * | 6/2002 | Akiyama et al. ........ 369/47.52 |

\* cited by examiner

*Primary Examiner*—Thang V. Tran
*Assistant Examiner*—Lixi Chow
(74) *Attorney, Agent, or Firm*—Birch, Stewart, Kolasch & Birch, LLP

(57) ABSTRACT

An apparatus and a method of determining an optimal writing power for an aged writable disk after checking whether a writable disk is aged or not, are discussed. The apparatus and method according to an embodiment read signals written on a writable disk, judge whether or not the writable disk is aged based on a signal characteristic, e.g., a level difference between the read signals before and after an equalization and jitter of the read signals, and conduct an OPC for the writable disk to obtain a precise optimal writing power if the disk is judged to be aged. The precise optimal writing power can prevent deterioration of reproduction characteristic of recorded data even though an aged writable disk is used.

20 Claims, 2 Drawing Sheets

METHOD AND APPARATUS OF DETECTING AN OPTIMAL WRITING POWER FOR AN AGED WRITABLE DISK

BACKGROUND OF THE INVENTION

1. Field of the Invention

The present invention relates to apparatus and method of determining an optimal writing power for an aged writable disk after checking whether an inserted writable disk is aged or not.

2. Description of the Related Art

In general, an optimal writing power is dependent upon state or type of a recording medium, recording speed, and features of a disk device such as laser quality, laser type, writing strategy, temperature characteristic, and so on. Therefore, a disk device conducts an OPC (Optimal Power Calibration) using an indicative optimum writing power written on an inserted writable disk in order to determine an optimal writing power before recording data onto the writable disk.

In OPC, a disk device reads an indicative optimum writing power 'Pind' written on an inserted writable disk first. Then, it repeats writing 1-ATIP-long test data onto a PCA area of the disk 15 times as changing the power 'Pind' by a step ($\Delta P$) every 1 ATIP advance. After completion of writing test data of 15 ATIP long, the disk device reads out the entire test data sequentially and determines an actual optimal writing power based on a characteristic curve made from the reproduced test data.

However, if a writable disk such as a CD-RW is aged, namely, if a writable disk has been repeatedly overwritten many times, an optimal writing power determined through an OPC may be not optimal to recording surface characteristic of an aged disk.

Therefore, it is necessary to exactly judge a disk to be aged or not and to conduct an improved optimal power determining manner being able to get more precise optimal writing power than a conventional OPC if the disk is aged.

SUMMARY OF THE INVENTION

It is an object of the present invention to provide an optimal writing power determining method and apparatus that can judge exactly whether an inserted disk is aged or not, and conduct an opc at least twice to determine a writing power optimal to characteristic of an aged recording surface if the disk is judged to be aged.

It is another object of the present invention to provide an optimal writing power determining method and apparatus that address the problems and limitations associated with the related art.

A method and apparatus of determining an optimal writing power for an aged writable disk in accordance with an embodiment of the present invention the present invention reads signals written on a writable disk, judges whether or not the writable disk is aged based on a signal characteristic such as a level difference between the read signals before and after an equalization and jitter of the read signals, and conducts an opc at least twice for the writable disk if judged to be aged.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFFERRED EMBODIMENTS

In order that the invention may be fully understood, preferred embodiments thereof will now be described with reference to the accompanying drawings.

Figure 1:
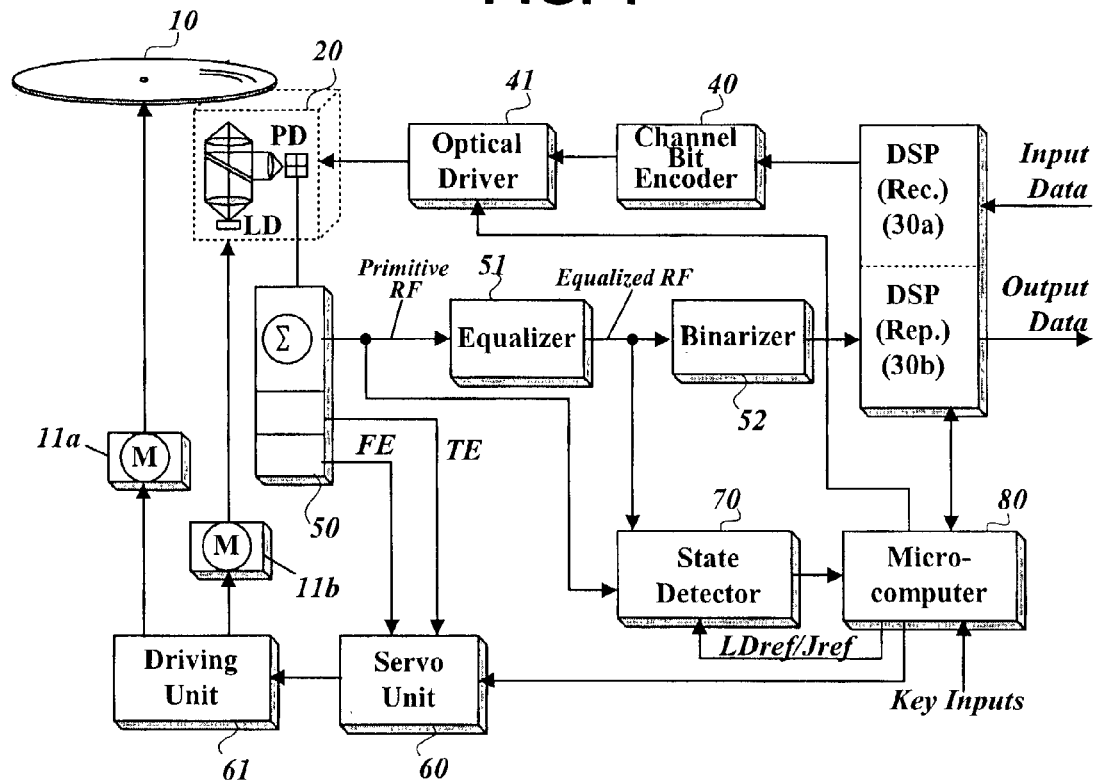
FIG. 1 is a simplified block diagram of a disk drive in which a method of determining an optimal writing power for an aged disk in accordance with the present invention is embedded.

FIG. 1 is a simplified block diagram of a disk drive in which a method of determining an optimal writing power for an aged disk in accordance with the present invention is embedded.

The disk drive of FIG. 1 comprises a digital recording signal processing unit 30a for converting input data into record-formatted EFM (Eight to Fifteen Modulation) data while adding additional data such as error correction codes (ECC); a channel bit encoder 40 for converting the record-formatted data into writing bits; an optical driver 41 for yielding signals to drive an LD (Laser Diode) according to the writing bits; an optical pickup 20 for writing signals onto surface of a writable disk 10 and for reading written signals from the surface of the optical disk 10; a signal combiner 50 for producing a primitive RF signal, a tracking and a focusing error signal by combining/subtracting electric signals made from reflected beams by the pickup 20; an equalizer 51 for equalizing all frequency subbands of the primitive RF signal in amplitude through different amplifying ratio for each subband; a binarizer 52 for binarizing the equalized RF signal; a driving unit 61 for driving a sled motor 11b to move the optical pickup 20 and a spindle motor 11a to rotate the disk 10; a servo unit 60 for conducting tracking/focusing operation of an objective lens in the pickup 20 and controlling the driving unit 61 to rotate the disk 10 at a constant speed; a digital reproduced signal processing unit 30b for restoring original data from the binarized signals using a self clock synchronized with the binarized signals in phase; a state detector 70 for judging the disk 10 to be aged or not based on a level difference between RF signal before and after the equalization of the equalizer 51 and/or jitter of the RF signal, and for outputting signals indicative of a result of the judgement; and a microcomputer 80 for controlling an overall recording/reproducing operation, especially, for determining how many times to conduct an OPC in response to the judgement signals from the state detector 70.

Figure 2:
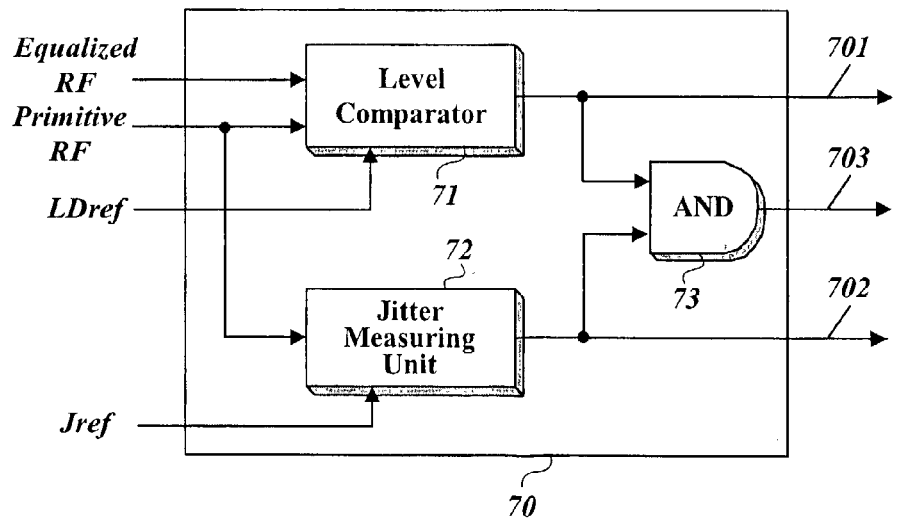
FIG. 2 is a detailed block diagram of a state detector to judge whether a disk is aged or not.

FIG. 2 is a detailed block diagram of the state detector 70. As shown in FIG. 2, the state detector 70 comprises a level comparator 71 detecting a level difference of the primitive RF signal from the signal combiner 50 and the equalized RF signal from the equalizer 51, and outputting a HIGH signal 701 if the level difference is larger than a preset reference 'LDref' or a LOW 701 if not; a jitter measuring unit 72 measuring jitter of the primitive RF signal and outputting a HIGH signal 702 if the measured jitter is greater than a preset reference 'Jref' or a LOW 702 if not; an AND gate 73 conducting an AND-logic operation of the two inputs 701 and 702.

The magnitude of the reference 'Jref' is set to a maximum jitter detectable from a not-aged disk.

Figure 3:
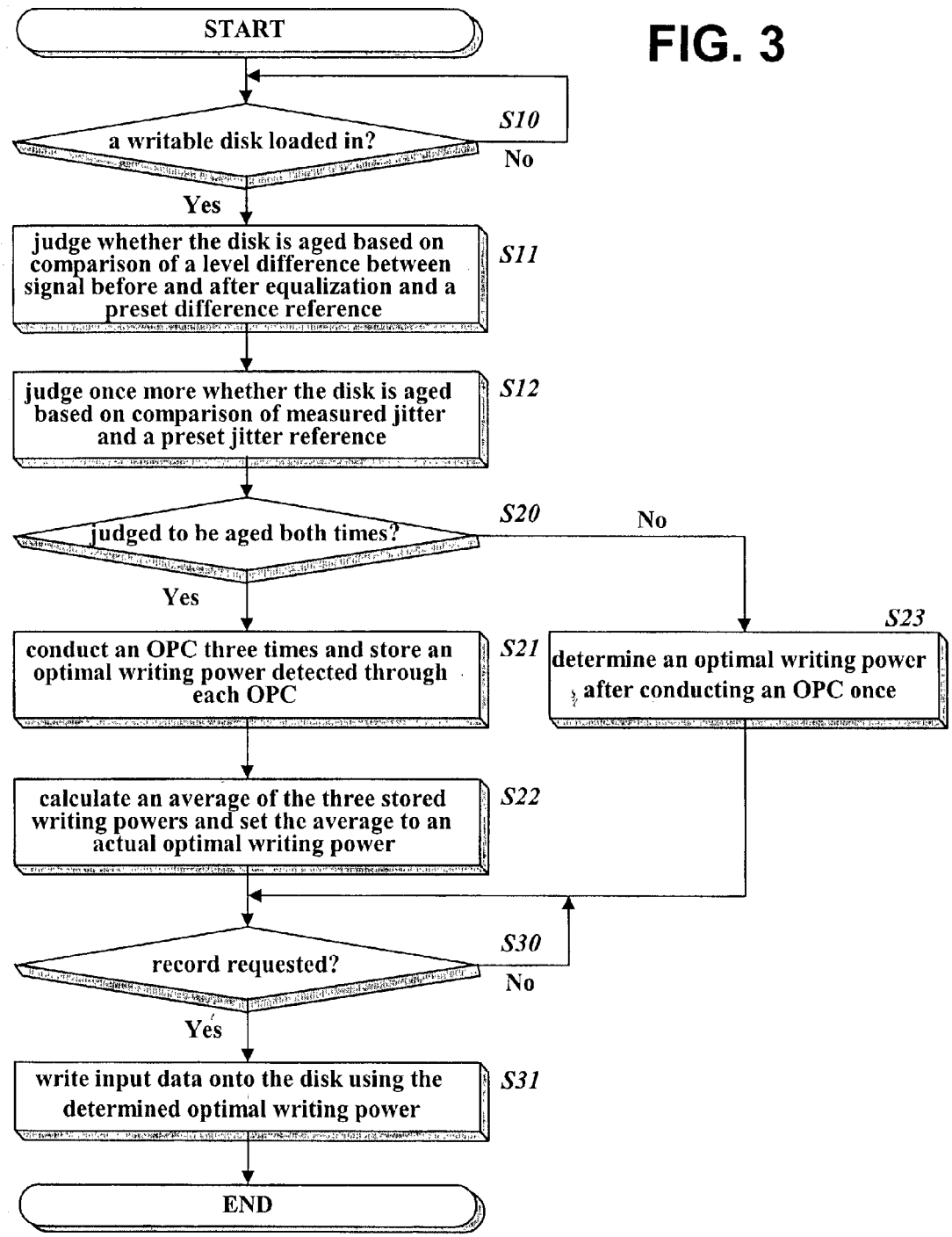
FIG. 3 is a flow chart of an embodiment of a method of determining an optimal writing power for an aged disk in accordance with the present invention.

FIG. 3 is a flow chart of a preferable embodiment of a method of determining an optimal writing power for an aged disk in accordance with the present invention. The flow chart of FIG. 3 conducted by the disk drive structured as FIGS. 1 and 2 is explained in detail below.

When a writable disk 10 such as a CD-RW is loaded in (S10), the microcomputer 80 rotates the disk 10 by driving the driving unit 61 via the servo unit 60. The optical pickup 20 divides a reflected beam from the rotating disk 10 and converts the divided beams into respective electric signals. The signal combiner 50 produces a primitive RF signal, a tracking error (TE) and a focusing error (FE) signal through combining the respective electric signals and/or subtracting them each other.

The equalizer 51 equalizes all frequency subbands (e.g., 3T, 4T, . . . , 11T signal component) with different amplifying coefficients therefor. In other words, the equalizer 51 uses larger amplifying coefficient for a short signal than for a long signal because a short signal is smaller in amplitude than a long signal. The binarizer 52 binarizes the equalized RF signal from the equalizer 51 and the binarized signal is processed by the digital reproduced signal processing unit 30b to be restored to original digital data.

In the above data restoring process, the level comparator 71 detects a level difference between the primitive RF signal from the signal combiner 50 and the equalized RF signal from the equalizer 51, and subtracts the preset reference 'LDref' from the detected level difference. If the subtracted result is positive, the level comparator 71 makes its output 701 HIGH, and if negative, it makes LOW (S11).

At the same time, the jitter measuring unit 72 measures jitter magnitude of the primitive RF signal, and compares the measured jitter with the preset reference 'Jref'. If the measured jitter is greater than the reference 'Jref', the jitter measuring unit 72 makes its output 702 HIGH, and if not, it makes LOW (S12).

The output 701 from the level comparator 71 and the output 702 from the jitter measuring unit 72 are ANDed 703 each other by the AND gate 73.

By the way, if the inserted disk 10 is aged the primitive RF is small in magnitude. However, the equalized RF signal is not nearly unchanged in magnitude regardless of whether aged or not because the equalizer 51 always amplifies an input signal up to a certain level irrespective of level of the input signal. Therefore, the more the disk is aged the larger the difference between the primitive RF and the equalized RF signal is. Consequently, it can be known whether the disk is aged or not if the level difference and the preset reference 'LDref' are compared each other.

In addition, if a writable disk has been overwritten many times boundary between a mark and a space formed on the writable disk is so unclear that jitter arises as much. Therefore, if jitter is compared with the reference 'Jref', namely, a maximum magnitude of jitter that can arise from a not-aged disk, it can be also known whether the disk is aged or not.

The two references 'LDref' and 'Jref' are preferably adjusted by the microcomputer 80. The adjustable references can reduce judgement errors on whether a disk is aged or not. For example, if data reproduction from a disk fails repeatedly after data record even though a disk is not judged to be aged, the two references are set smaller to increase a probability that judges a disk to be aged.

The microcomputer 80 can judge whether aged or not based on either of the two outputs 701 and 702 from the level comparator 71 and the jitter measuring unit 72 or based on both outputs 701 and 702, namely, the ANDed output 703 of the AND gate 73. Preferably, the microcomputer 80 judges based on the output 703 of the AND gate 73 to strictly judge a disk to be aged.

If the output 703 of the AND gate 73 is HIGH the microcomputer 80 judges the disk 10 to be aged, and if LOW it judges to be not (S20).

If the disk 10 is judged to be not aged, the microcomputer 80 conducts OPC only once to obtain an optimal writing power (S23), and if judged to be aged it does OPC several times, e.g., three times (S21). In the latter case, whenever an OPC is conducted, a detected optimal writing power is memorized. After completion of three OPC operations, an average of the memorized optimal writing powers is calculated and set to an actual optimal writing power (S22). Because an optimal writing power is determined for an aged writable disk through repetition of OPC operation more than once, the determined writing power is much more optimal to an aged disk.

When data is inputted to be recorded (S30) after an optimal writing power is determined as before, input data is encoded with parity by the digital recording signal processing unit 30a to form ECC blocks to improve reliability of data recording/reproduction. Each ECC block is outputted in EFM-formatted serial bits from the digital recording signal processing unit 30a to the channel bit encoder 40 that modulates the serial bits into NRZ signals.

The optical driver 41 outputs PWM (Pulse-Width Modulated) writing signals according to the modulated NRZ signals while adjusting level and/or width of the PWM signal in accordance with the selected write strategy. At this time, the optical driver 41 uses the optimal writing power determined through OPC conducted once (for a not-aged disk) or several times (for a aged disk).

The outputs of the optical driver 41 are converted by the optical pickup 20 to light beams that form respective marks and spaces along a track of the writable disk 10 (S31).

The above-explained method and apparatus of determining an optimal writing power for an aged disk can judge exactly whether a writable disk is aged or not and determine an optimal writing power through several OPC operations for an aged disk, thereby preventing deterioration of reproduction characteristic of recorded data even though an aged writable disk is used.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus of recording data onto a writable disk, comprising:

a data reader reading signals written on the writable disk;

an equalizer equalizing levels of signals read by said data reader;

a judging unit judging whether or not the writable disk is aged based on a level difference between signals before and after the equalization of said equalizer; and a controller conducting an optimal power calibration for the writable disk according to the judging result of said judging unit.

2. The apparatus of claim 1, wherein said judging unit outputs a signal indicating that the writable disk is aged if the level difference is greater than a preset reference.

3. The apparatus of claim 1, wherein said judging unit further measures jitter of the read signals, and judges that the writable disk is aged if the level difference and the measured jitter are greater than a first and a second preset reference, respectively.

4. The apparatus of claim 3, wherein said controller adjusts the first and the second preset reference separately.

5. The apparatus of claim 1, wherein said controller sets an average of optimal writing powers to an actual optimal writing power for the writable disk, the optimal writing powers being individually determined through the optimal power calibration operations conducted at least twice.

6. The apparatus of claim 1, wherein the controller conducts the optimal power calibration at least twice for the writable disk according to the judging result outputted by said judging unit.

7. A method of determining an optimal writing power for a writable disk, comprising the steps of:
   (a) reading signals written on the writable disk;
   (b) equalizing levels of the read signals;
   (c) judging whether or not the writable disk is aged based on a level difference between signals before and after the equalization; and
   (d) conducting an optimal power calibration for the writable disk according to a result of the judging step.

8. The method of claim 7, wherein said step (c) judges that the writable disk is aged if the level difference is greater than a preset reference.

9. The method of claim 7, wherein said step (c) further measures jitter of the read signals, and judges that the writable disk is aged if the level difference and the measured jitter are greater than a first and a second preset reference, respectively.

10. The method of claim 7, further comprising the step of setting an average of optimal writing powers to an actual optimal writing power for the writable disk and using the set actual optimal writing power during writing of input data, wherein the optimal writing powers being individually determined through the optimal power calibration operations conducted at least twice.

11. The method of claim 7, wherein the conducting step includes conducting the optimal power calibration at least twice for the writable disk according to the result of the judging step.

12. A method of determining an optimal writing power for a writable disk, comprising the steps of:
   (a) reading signals written on the writable disk;
   (b) judging whether or not the writable disk is aged based on a characteristic of at least the read signals before amplification and equalization of the read signals; and
   (c) conducting an optimal power calibration for the writable disk according to a result of the judging step.

13. The method of claim 12, wherein said signal characteristic is a level difference between the read signals before and after equalization of the signals.

14. The method of claim 12, wherein said signal characteristic is jitter of the read signals before the equalization of the read signals.

15. The method of claim 12, wherein the conducting step includes conducting the optimal power calibration at least twice for the writable disk according to the result of the judging step.

16. The method of claim 15, further comprising setting an average of optimal writing powers to an actual optimal writing power for the writable disk, wherein the optimal writing powers are individually determined through the optimal power calibration operations.

17. The method of claim 12, wherein said signal characteristic is a combination of jitter of the read signals before the equalization of the read signals and a level difference between the read signals before and after the equalization of the read signals.

18. An apparatus of recording data onto a writable disk, comprising:
   a data reader reading a signal written on the writable disk;
   a signal combiner producing a primitive radio frequency signal based on the signal read by the data reader;
   a judging unit judging whether or not the writable disk is aged based on a characteristic of at least the primitive radio frequency signal before amplification and equalization of the primitive radio frequency signal; and
   a controller conducting an optimal power calibration for the writable disk according to the judging result of the judging unit.

19. The apparatus of claim 18, further comprising an equalizer equalizing the primitive radio frequency signal to obtain an equalized radio frequency signal, wherein the judging unit judges whether or not the writable disk is aged based on at least a jitter of the primitive radio frequency signal before the amplification and equalization of the primitive radio frequency signal.

20. The apparatus of claim 19, wherein the judging unit judges whether or not the writable disk is aged further based on a level difference between the primitive radio frequency signal and the equalized radio frequency signal.

* * * * *